US010897906B2

(12) United States Patent
Milling et al.

(10) Patent No.: US 10,897,906 B2
(45) Date of Patent: Jan. 26, 2021

(54) FUNGICIDE FOR THE TREATMENT OF FUNGAL PATHOGENS CAUSING MYCOTOXINS

(71) Applicant: AGRONATURALIS LTD, Ringwood (GB)

(72) Inventors: Richard Milling, Manchester (GB); Jean-Pierre Laffranque, Marcy (FR); Bernd Tiggemann, Blaufelden (DE); Stephen Shires, Ringwood (GB)

(73) Assignee: AGRONATURALIS LTD, Ringwood (GB)

( * ) Notice: Subject to any disclaimer, the term of this patent is extended or adjusted under 35 U.S.C. 154(b) by 0 days.

(21) Appl. No.: 15/756,343

(22) PCT Filed: Sep. 5, 2016

(86) PCT No.: PCT/EP2016/070814
§ 371 (c)(1),
(2) Date: Feb. 28, 2018

(87) PCT Pub. No.: WO2017/037277
PCT Pub. Date: Mar. 9, 2017

(65) Prior Publication Data
US 2018/0242586 A1    Aug. 30, 2018

(30) Foreign Application Priority Data

Sep. 3, 2015 (GB) .................................. 1515600.3

(51) Int. Cl.
*A01N 59/00* (2006.01)
*A01N 25/30* (2006.01)
*A01N 59/04* (2006.01)

(52) U.S. Cl.
CPC ............. *A01N 59/00* (2013.01); *A01N 25/30* (2013.01); *A01N 59/04* (2013.01)

(58) Field of Classification Search
CPC ......... A01N 59/00; A01N 25/30; A01N 59/04
See application file for complete search history.

(56) References Cited

U.S. PATENT DOCUMENTS 4,479,004 A * 10/1984 Hubele .................. A01N 43/50
514/937
5,389,386 A    2/1995 Winston et al.
(Continued)

FOREIGN PATENT DOCUMENTS

| | | |
|---|---|---|
| JP | S54-37827 A | 3/1979 |
| WO | 95/12975 A1 | 5/1995 |

OTHER PUBLICATIONS

International Preliminary Report on Patentability for Application No. PCT/EP2016/070814 dated Mar. 15, 2018.
(Continued)

*Primary Examiner* — Hong Yu
(74) *Attorney, Agent, or Firm* — The Dobrusin Law Firm, P.C.

(57) ABSTRACT

Fungal diseases and resulting mycotoxins are reduced or eliminated from plant tissues during crop growth or post-harvest during storage by treatment with an aqueous spray solution prepared from a fungicide composition of a bicarbonate salt containing a surfactant system to reduce the surface tension and contact angle of the spray solution on the plant surface thereby controlling the crystal size of the bicarbonate and re-distribution and adherence of the crystals to the crop vegetation and/or grains.

20 Claims, 3 Drawing Sheets

(56) References Cited

U.S. PATENT DOCUMENTS

Figure 1:
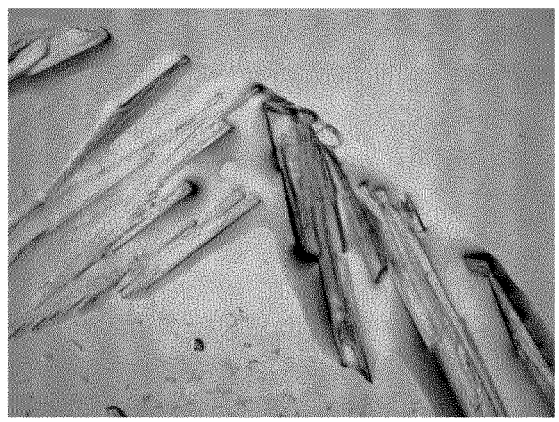
Figure 1:
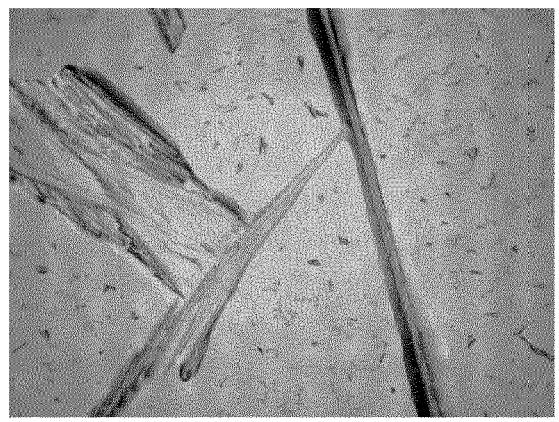
Figure 2:
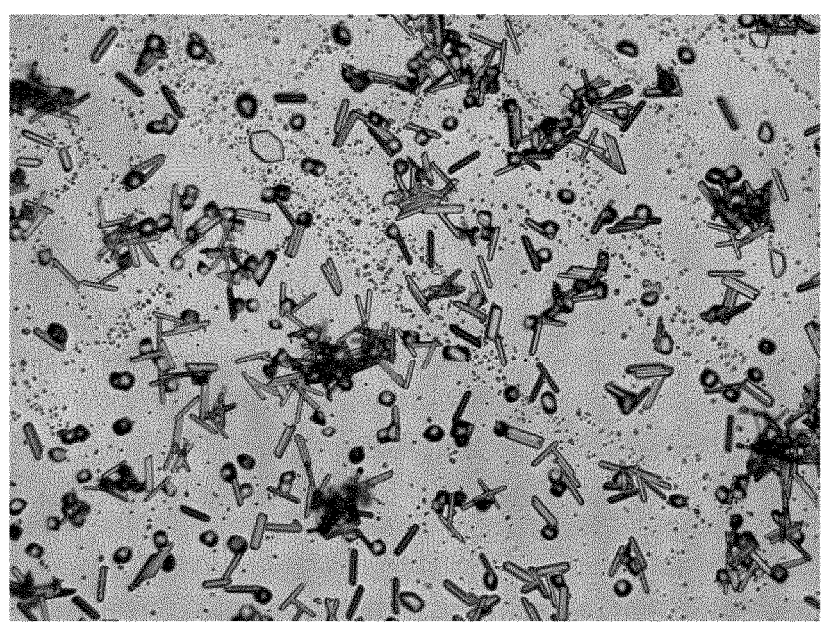
Figure 4:
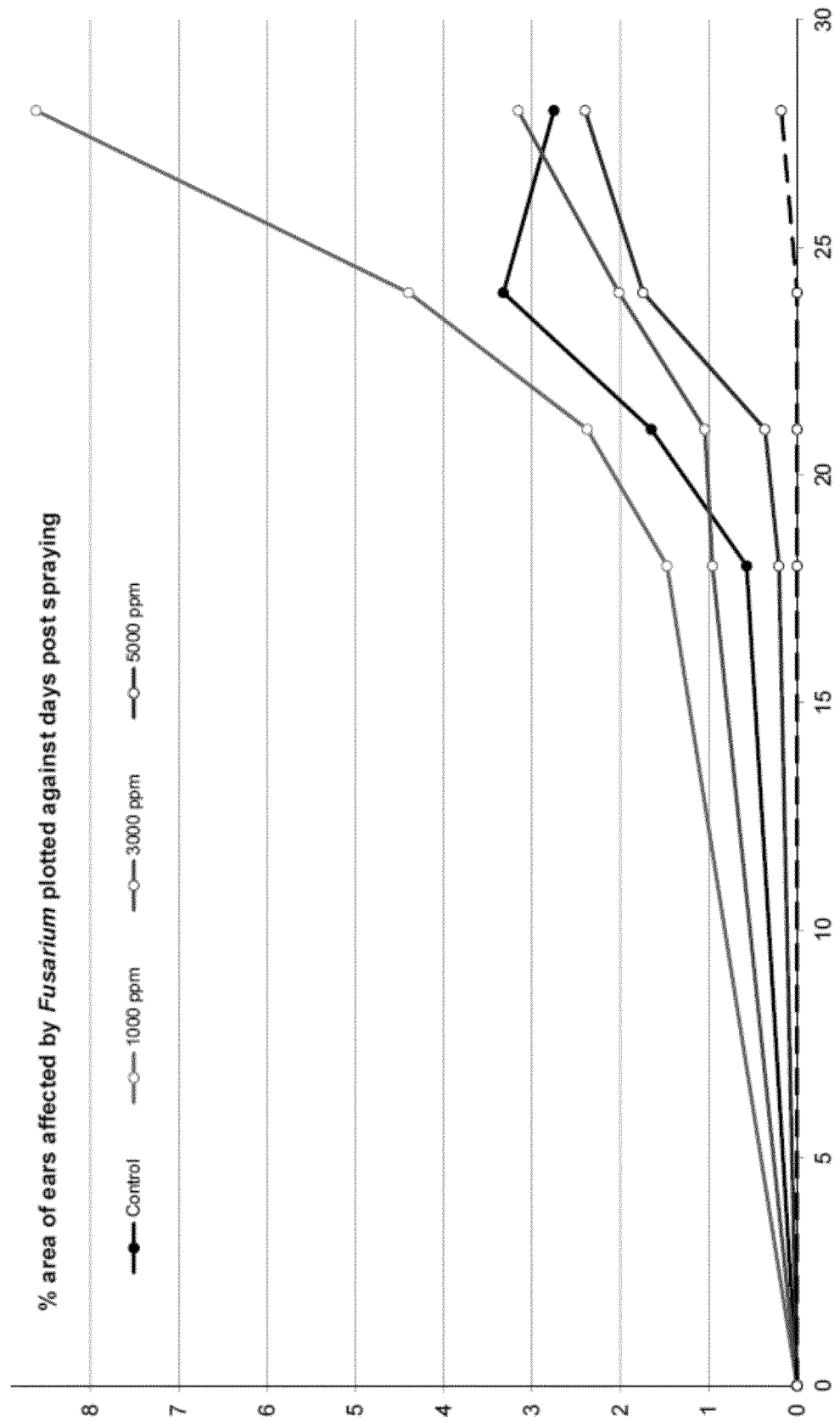

| | | |
|---|---|---|
| 5,415,877 A | 5/1995 | Winston |
| 5,432,147 A | 7/1995 | Winston et al. |
| 5,496,568 A | 3/1996 | Winston |
| 5,518,986 A | 5/1996 | Winston |
| 5,518,987 A | 5/1996 | Winston |

OTHER PUBLICATIONS

UK Search Report, Application No. GB1515600.3 dated Mar. 4, 2016.

International Search Report and Written Opinion, Application No. PCT/EP2016/070814 dated Nov. 10, 2016.

Abbott et al. "Spreading of spray mixtures on leaf surfaces: I. relative effectiveness of various physico-chemical predictors", Pesticide Science., vol. 28, No. 4, Jan. 1, 1990, pp. 419-429.

Koch et al. "Diversity of structure, morphology and wetting of plant surfaces", vol. 4, No. 10, Jan. 1, 2008, p. 1943.

Samapundo et al. "Interaction of water activity and bicarbonate salts in the inhibition of growth and mycotoxin production by *Fusarium* and *Aspergillus* species of importance to corn", International Journal of Food Microbiology, vol. 116, No. 2, Mar. 29, 2007, pp. 266-274.

E. A. Milus, Evaluation of Foliar Fungicides for Controlling Fusarium Head Blight of Wheat, pp. 697-699 (1994).

\* cited by examiner

FIGURE 3

Apparent incidence of *Fusarium* in ears plotted against days post spraying

FUNGICIDE FOR THE TREATMENT OF FUNGAL PATHOGENS CAUSING MYCOTOXINS

The present invention relates to the use of a fungicide composition for the treatment and control of fungal pathogens causing mycotoxins and in particular to the treatment of cereals and rice to reduce or eliminate the production and/or presence of mycotoxins with a formulation containing the fungicide composition typically an aqueous solution of the fungicide composition. The invention additionally relates to cereals and rice treated with the fungicide and the use of the cereals and rice in human and animal feedstuffs.

Mycotoxins are the secondary metabolites produced mainly by fungus species such as *Aspergillus, Fusarium* and *Penicillium*. The most common mycotoxins produced by these fungi include aflatoxins, ochratoxin A, fumonisins, deoxynivalenol, T-2 toxin and zearalenone. Aflatoxins and more particularly aflatoxin B1 (AFB1), aflatoxin B2 (AFB2), aflatoxin M1 (AFM1), aflatoxin M2 (AFM2), aflatoxin G1 (AFG1) and aflatoxin G2 (AFG2) are highly toxic, mutagenic, carcinogenic, immunosuppressant and teratogenic compounds. This invention is concerned with both the treatment and control of such mycotoxins including fungal pathogens inducing mycotoxins and the mycotoxins themselves.

Commodities frequently contaminated with mycotoxins include cereals (wheat, barley, maize, oats, rye and triticale), rice, nuts (peanuts and pistachios), fresh, dried or processed fruits (apricots, figs, grapes, plums, raisins and wine), spices and pulses. Human beings are exposed to mycotoxins either directly by eating the contaminated foodstuffs or indirectly via animal products.

A mycotoxin is a toxic chemical produced by fungi that readily colonize crops, typically fungi that colonize cereal crops such as wheat, barley, maize, rice, oats, rye and triticale. One mould species may produce many different mycotoxins and the same mycotoxin may be produced by several species. Most fungi are aerobic (use oxygen) and are found almost everywhere in extremely small quantities due to the minute size of their spores. They consume organic matter whenever humidity and temperature are sufficient. Where conditions are right, fungi proliferate into colonies and mycotoxin levels become high.

The production of mycotoxins depends on the surrounding intrinsic and extrinsic environments and the mycotoxins vary greatly in their severity, depending on the organism infected and its susceptibility, metabolism and defence mechanisms.

Mycotoxins can appear in the food chain as a result of fungal infection of crops, either by being eaten directly by humans or by being used as livestock feed. Mycotoxins greatly resist decomposition or being broken down in digestion, so they remain in the food chain in meat and dairy products. Even temperature treatments, such as cooking and freezing do not destroy some mycotoxins.

In Europe, statutory levels of a range of mycotoxins permitted in food and animal feed are set by a range of European directives and Commission regulations. The US Food and Drug Administration has regulated and enforced limits on concentration of mycotoxins in foods and feed industries since 1985. These compliance programs apply to food products including peanuts and peanut products, tree nuts, maize and maize products, cottonseed and milk.

There are several groups of mycotoxins.

Aflatoxins are a type of mycotoxin produced by *Aspergillus* species of fungi, such as *A. flavus* and *A. parasiticus*. The term aflatoxin refers to four different types of mycotoxins produced which are B1, B2, G1 and G2. Aflatoxin B1, the most toxic, is a potent carcinogen and has been directly correlated to adverse health effects such as liver cancer. Aflatoxins are largely associated with commodities produced in the tropics and subtropics such as cotton, peanuts, spices, pistachios and maize.

Ochratoxin is a mycotoxin that comes in three secondary metabollte forms, A, B and C. All are produced by *Penicillium* and *Aspergillus* species. The three forms differ in that Ochratoxin B (OTB) is a non-chlorinated form of Ochratoxin A (OTA) and that Ochratoxin C (OTC) is an ethyl ester form of Ochratoxin A. *Aspergillus ochraceus* is found as a contaminant of a wide range of commodiies including beverages such as beer and wine. *Aspergillus carbonarius* is the main species found on vine fruit, which releases its toxin during the juice making process. OTA has been labelled as a carcinogen and a nephrotoxin and has been linked to tumours in the human urinary tract.

Citrinin is a toxin that was first isolated from *Penicillium citrinum* but has been identified in over a dozen species of *Pencillium* and several species of *Aspergillus*. Some of these species are used to produce human foodstuffs such as cheese (*Penicillium camemberti*), sake, miso and soy sauce (*Aspergillus oryzae*). Citrinin is associated with yellow rice disease in Japan and acts as a nephrotoxin in all animal species tested. It is associated with many human foods (wheat, rice, maize, barley, oats, rye and food coloured with Monascus pigment).

Ergot Alkaloids are compounds produced as a toxic mixture of alkaloids in the sclerotia species of *Claviceps*, which are common pathogens of various grass species. The Ingestion of ergot sclerotia from infected cereals, commonly in the form of bread produced from contaminated flour, causes ergotism, the human disease historicaly known as St Anthony's Fire.

Patulin is a toxin produced by the *P. expansum, Aspergillus, Penicillium* and *Paecilomyces* fungal species. *P. expansum* is especially associated with a range of mouldy fruits and vegetables, in particular rotting apples and figs. It is destroyed by the fermentation process and so is not found in apple beverages such as cider. Although patulin has not been shown to be carcinogenic, it has been reported to damage the immune system in animals. In 2004 the European Community set limits to the concentration of patulin in food products. They currently stand at 50 µg/kg in all fruit juice concentrations, at 25 µg/kg in solid apple products used for direct consumption and at 10 µg/kg for children's apple products including apple juice.

*Fusarium* toxins are produced by over 50 species of *Fusarium* and have a history of infecting the grain of developing cereals such as wheat, barley, oats, rye, triticale, maize and rice. They include a range of mycotoxins such as: the fumonisins and trichothecenes which are most strongly associated with toxic effects in animals and humans. Some of the other major types of *Fusarium* toxins include: beauvercin and enniatins, butenolide, equisetin and fusarins.

A wide range of fungicides have been proposed for the treatment of crop vegetation particularly cereals to reduce or eliminate the formation and/or presence of mycotoxins. An article in Plant Disease July 1994 pages 697m to 699 describes the evaluation of foliar fungicides for controlling *Fusarium* Head Blight of wheat which according to the article may be associated with mycotoxin contamination of grain.

Trials in 1992 were performed using eleven different fungicides together with alkylaryl polyethoxylate and the sodium salt of alkysulfonated alkylate (Latron® CS-7 at 234 miha). One of the eleven fungicides tested was potassium bicarbonate at 13.4 kg/ha. Further trials were performed in 1993 although potassium bicarbonate was not Included. The conclusion of the study was that fungicides effective for controling foliar wheat diseases are not effective for controlling head blight or reducing DON (deoxynivalenol) level of the grain in severe epidemics. It also concluded that some fungicides (unspecified) may be effective under less severe conditions.

Bicarbonates or carbonates ae known to be effective fungicides, in particular compositions of inorganic and ammonium bicarbonates particularly alkali metal and ammonium bicarbonates and more particularly potassium bicarbonate are disclosed as effective fungicides in U.S. Pat. No. 5,432,147. The formulations are said to comprise about 0.1 to 3 wt % of an alkali metal or ammonium bicarbonate and from about 0.01-0.5 wt % of an ingredient selected from non-ionic alkoxylated alkanol and alkoxylated alkylphenol surfactants having an HLB between about 8 and 15. U.S. Pat. No. 5,415,877 also relates to the use of bicarbonates as fungicides and discloses their use in conjunction with surfactant blends comprising salts of sulfosuccinates and sodium lauryl sulfate.

We have found that the performance of bicarbonates in relation to the treatment and control of mycotoxin-inducing fungi and the formation of mycotoxins depends upon the degree of surface interaction between the bicarbonate active ingredient and the mycotoxin-inducing fungal pathogen which is in turn dependent on the size and distribution of the particles of the bicarbonate formed on the crop vegetation when the water from the spray of the aqueous solution of the fungicide composition is removed typically by evaporation. Alkali bicarbonates and particularly potassium bicarbonate does not have any surface active properties and the surface interactions with foliage following spray application of the aqueous solution are minimal. The surface properties of aqueous solutions of potassium bicarbonate at typical in-use concentrations (2-5% active ingredient) are such that the surface tension and contact angle with the plant tissues are virtually identical to that achieved with water alone as Illustrated in FIG. 1 hereof.

We have found that in order for aqueous spray solutions prepared from bicarbonate based fungicides to be effective for the control and treatment of mycotoxin-inducing fungi and resulting mycotoxins they should have a degree of wetting and spreading when the aqueous spray prepared from the fungicidal composition is applied to plant surfaces as Indicated by a surface tension below 45 mN/m preferably below 40 mN/m preferably from 25 mN/m to 45 mN/m, more preferably from 28 mN/m to 32 mN/m giving rise to a contact angle with the plant surface of less than 60° preferably from 35° to 60°, more preferably from 35° to 45°. If the contact angle is too low the aqueous formulation may slide off the surface of the vegetation. This reduction in surface tension and contact angle by the addition of one or more surfactants into the product enables the production of small crystals on the foliage after evaporation of the water solvent. Additionally, we have found that to be effective in the treatment and control of mrycotoxin-inducing fungi and mycotoxins the average crystal size of the bicarbonate formed on the plant surface after evaporation of the water should be less than 0.4 mm. Applied spray drops with high contact angle form small beads on the surface with a relatively high concentration of active ingredient within the droplets. This in turn produces very large crystals upon evaporation of the water leading to localisation of the fungicide effect and moreover the relatively high concentration may give rise to localised scorching of the leaf surface. Whilst the reduction of surface tension and contact angle as achieved by this invention reduces crystal size which reduces the potential for localised scorching (phytotoxicity). However there is a balance of properties in that the reduction of surface tension and contact angle to below a certain level can result in supper wetting of the plant surface which in turn can lead to material flowing off the plant surface resulting in loss of active ingredient and reduced performance.

With the surface properties provided by this invention the use of bicarbonates as pesticides is effective and has the advantage that any residues that may be left in the plant and perhaps in food derived therefrom are products that naturally occur in the plant.

The present invention therefore provides the use as a fungicide for the reduction or elimination of mycotoxin-inducing fungi and mycotoxins from crop vegetation, of a formulation comprising a bicarbonate salt composition and a surfactant system whereby the spray solution prepared from the fungicide composition has a surface tension in the range 25 to 45 mN/m preferably in the range 28-32 mN/m and a contact angle less than 60° preferably in the range 35-60° and more preferably in the range 35-45°.

In a further embodiment the Invention provides the use for the control and treatment of mycotoxin-inducing fungi and mycotoxins of crystals of a bicarbonate salt on the plant surface of size less than 0.4 mm.

In a further embodiment the invention provides an aqueous spray solution of a fungicide formulation comprising a bicarbonate salt and a surfactant system which when applied to vegetation results in crystals of the bicarbonate salt on the plant surface of a size less than 0.4 mm upon evaporation of the water of the aqueous spray solution.

In this application surface tension and contact angle were measured using a Kruss DSA30 system, the latter was measured using a pendant drop technique with analysis carried out after application of the Laplace-Young equation, the former was measured following application of a droplet on to an artificial hydrophobic (Para-film) surface. The particle sizes of the crystals of the bicarbonate salt were determined by microscopy following the application of Motic Advanced Imaging Software.

The invention is particularly useful for the reduction or elimination of mycotoxins in cereals such as wheat, corn, barley, maize, rice, oats, rye and triticale. The formulation may be applied to the crops during crop growth prior to harvesting or may be applied to the grain obtained prior to storage and/or use in the production of foodstuffs.

The invention has been found to be particularly useful in the treatment and control of *Fusarium* species on cereals such as wheat, barley, oats, rye, triticale, maize and on rice where it has been found to be effective in the reduction of prevention of the presence of mycotoxins. *Fusarium* exists as many species which can cause ear blight in wheat which is typified by bleached grains. *Fusarium graminearum* and *Fusarium culnorum* are two prevalent species with which this invention has found to be particularly useful.

The bicarbonate salt used in the fungicide composition that is used in the present Invention is preferably an alkali metal bicarbonate and more preferably sodium bicarbonate or potassium bicarbonate or mixtures thereof. The alkali metal bicarbonate or bicarbonates may also be used in admixture with ammonium bicarbonate. The bicarbonate may also be used in combination with an alkali metal or ammonium carbonate. It is preferred that the aqueous spray solutions prepared from the fungicide composition contain from 0.04 to 8.5 wt % preferably 0.25 to 8.5 wt % more preferably 2 to 5 wt % of the alkali metal and/or ammonium bicarbonate when used with cereals it is preferred to employ a concentration greater than 0.1 wt % of the bicarbonate. A more dilute solution may be used with fruit and vegetables.

The nature and amount of the surfactant that should be used is selected so that the aqueous spray solutions prepared from the fungicide composition containing the alkali metal and/or ammonium bicarbonate have a surface tension in the range 25-45 mN/m preferably below 40 mN/m and more preferably in the range 28-32 mN/m and a contact angle below 60° preferably in the range 35-60° more preferably in the range 35-45°. After the aqueous spray solution prepared from the fungicide composition has been applied to the crop vegetation in an agricultural environment the water component of the spray solution will be removed from the surface of the crop vegetation leaving the bicarbonate and the surfactant on the surface of the crop vegetation. The surfactant performs several functions, firstly it controls the viscosity of the aqueous spray solution to provide a readily sprayable material. Secondly, it ensures that upon spraying the fungicide spray solution is dispersed across the full surface of the crop vegetation, third, it ensures that when the water from the fungicide spray solution is evaporated the remaining crystals of the bicarbonate material are small and well distributed over the full surface of the plant. This additionally ensures long lasting fungicidal effect and prevents surface scorching which can occur with larger crystals. Fourthly, it ensures that the bicarbonate when sprayed onto the plant after removal of the water from the spray solution adheres to the plant to give long lasting fungicidal effect.

In a preferred embodiment the surfactant will Include at least two materials one of which acts as a dispersant and controls the particle size of the crystals of the bicarbonate salt and the other acts as a spreader and sticker to distribute the aqueous spray solution and the small salt crystals that derive therefrom across the full surface of the crop vegetation and increase the adhesion of the crystals to the plant surface. We have found that by using a combination of surfactants the desired properties as previously discussed may be achieved using smaller amounts of surfactant than when a single surfactant is employed.

The Benefits can be achieved by using a mixture of surfactants; the preferred ratio of surfactants will depend upon the individual surfactants employed and can range from 1:5 to 5:1. The different effects that can be used employing a mixture of the two anionic surfactants sodium dodecyl sulphosuccinate (SDS) and sodium lauryl sulphate (SLS 90) are shown in the following table.

| | | Range Surfactant | | | |
|---|---|---|---|---|---|
| Property | Preferred range | None | SLS 90 | SDS | (50:50) SLS90 and SDS |
| Surface tension (mN/m) | 28-32 | 72-74 | 35-55 | 25-30 | 30 |
| Contact angle (°) | 35-45 | >95 | 55-75 | 22-32 | 38-45 |
| Crystal size (mm) | <0.4 | 2-10 | | | <0.4 |

The surfactants used can be non-ionic, anionic, cationic or amphoteric in nature or can be a combination of non-onics with any of the other three types or anionics with amphoterics. Preferred non-ionic surfactants may be selected from the list of alkoxylates such as ethoxylates, propoxylates or combinations thereof, block co-polymers, alkyl aryl polyalkyoxylates, alkoxylated block copolymers, alcohol ethoxylates or akoxylates which can be branched or straight chain, ethoxylated vegetable oils such as the castor oil ethoxylates, ethoxylated fatty amines, sorbitan esters and alkyl esters, glycerides and polyglycerides, polyethylene glycol polymers, fatty alcohols, polyalkoxylated ethers, glucoside alkyl ethers, amine oxides, amide salts such as cocamide, tallow amines and many others.

Preferred anionic surfactants may be selected from phosphate esters, substituted and non-substituted sulphonic acids, esters and haloesters of sulphosuccinic acid, monosulphate esters, naphthalene sulphonic acid derivatives, sulphonated vegetable oils, sulphonated esters of natural fatty acids, carboxylic acid derivatives, alkyl substituted succinic acid, polycarboxylic acid salts and many others.

Preferred cationic surfactants may be selected from the list of quaternary amine compounds (such as cetyl trimethylammonium bromide, cetyl pyridinium chloride, benzalkonium chloride, benzethonium chloride, dimethyldioctyldecylammonium chloride), amine modified polyalkylsiloxanes, mono, di- and tri-amine alkoxylated surfactants, carbylamines salts and many others.

Preferred amphoteric surfactants may be selected from surfactants where the cationic part is based on primary, secondary or tertiary amines or quaternary ammonium cations and the anionic part could comprise sulphonates, betaines such as cocamidopropyl betaine, they can have a carboxylate with the ammonium, phosphate anions such as in the phospholipids and many others.

The materials used in the present invention may be supplied as a concentrate for dilution by the ultimate user. For example a concentrate may contain from 80 to 90% by weight of the bicarbonate. The spray solutions prepared from the fungicide composition used in this invention are aqueous solutions typically having a concentration of from 0.1 to 8.5 wt % preferably from 0.25 to 8.5 wt % bicarbonate more preferably 2 to 5 wt % bicarbonate.

The treatment rate of the fungicide composition used in the present invention required to control, reduce or eliminate mycotoxin-inducing fungi and mycotoxins will depend upon the nature of the crop that is to be treated and the nature of the mycotoxin with which one is concerned. However we have found that rates of from 0.5 to 10 preferably from 3 to 10 kilograms per hectare are particularly useful for the treatment of cereals such as wheat, barley, oats, rye, triticale, maize and rice. The fungicide composition of this invention may be used in combination with other known fungicides.

The invention is illustrated by reference to the following Examples.

EXAMPLE 1

Potassium bicarbonate was dissolved in water at a concentration of 4.25 wt % and droplets were deposited on an artificial hydrophobic (para-film) surface.

A formulation was prepared containing 85 wt % potassium bicarbonate and 15 wt % of a surfactant combination of sodium dioctylsulfosuccinate and sodium laurylsulfate. The formulation was dissolved in water at a concentration of 5.0 wt %. Again, droplets were deposited on the artificial hydrophobic surface.

FIGS. 1 and 2 show the residual crystals of potassium bicarbonate remaining on the surface after evaporation of the water. Comparison of the Figures clearly shows the smaller more evenly distributed crystals derived from the formulation containing the surfactant mixture.

EXAMPLE 2

Spring wheat, *Triticum aestivum* was grown in pots and sprayed, at ear stage, with the surfactant containing formulation used in Example 1 at three different concentrations, 1000, 3000 and 5000 ppm, shortly before spraying the plants were inoculated with a *Fusarium graminearum* spore suspension. The efficacy of the treatment was assessed using a photographic scale and compared with untreated ears.

The sprayers were roughly calibrated and amount per pot was weighed to ensure that each pot received around the same amount of spray solution. For the treatments this varied from 24.2 to 27.1 g.

*Fusarium graminearum* spore suspension from Arbiotech, Saint Gilles, France was allowed to melt (supplied frozen), diluted to 105 mL- and Tween 20 added and sprayed onto the plants, the average dose per pot was 25.2 mL.

The plants were placed in the dark in a controlled environment room after inoculation and remained there for 2 days. The temperatures were between 24.6 and 25.8° C. and the humidity was between 77 and 90%. After this the plants were placed in a greenhouse and supported by canes and string lines.

When effects were visible visual estimations of % effect were carried out for every mature ear (small immature ears were ignored) using a scale which categorised ears into 9, 5, 10, 20, 30, 50, 60, 80 and 100% affected. This was done at 18, 21, 24 and 28 days after application of the fungicide. Finally the ears were cut and weighed on the assumption that dead ears would have lower weight.

The following parameters were measured.

Number of ears per pot.

Total infection score per pot.

Number of infected ears per pot.

Average disease % per ear per pot and pre-treatment

Disease incidence per treatment

Fresh weight of ears per pot, per ear per pot and per ear per treatment

Ear weight is also given for extra non-inoculated pots.

% incidence and % infection are also given as graphs.

The results are plotted in FIGS. 3 and 4.

EXAMPLE 3

The spray solution of the surfactant containing fungicide composition employed in Example 2 was tested for the control of mycotoxins formed due to ear blight (*Fusarium* spp.) in winter wheat. The fungicide composition was applied to Cubus winter wheat at various treatment rates and the number of healthy ears of wheat per 200 plants was determined 36 days after application of the fungicide composition.

The results were as follows.

| Treatment Level Kg/ha | Healthy Ears per 200 plants |
|---|---|
| 0 | 141 |
| 3 | 155 |
| 5 | 150 |
| 7.5 | 162 |

The crop plots were harvested and the samples analysed for the presence of the mycotoxins Deoxynivalenol (DON) and Zearalenone (ZEA) with the following results.

| Treatment Level Kg/ha | DON Mg/kg | ZEA Mg/kg |
|---|---|---|
| 0 | 4.2 | 4000 |
| 3 | 4 | 5000 |
| 5 | 4.5 | 2200 |
| 7.5 | 1.5 | 1100 |

EXAMPLE 4

A trial was conducted in the field to evaluate the efficacy and crop safety of the product of the invention, in relation to *Fusarium* ear bight on winter wheat. Trials were performed with the product as employed in Example 1 stand-alone and in a mixture with the commercial fungicide FOLICUR. The performance was compared to the commercial fungicides FOLICUR and DON Q. The trial site was inoculated with *Fusarium culmorum* spore suspension at the beginning of flowering.

The assessment was conducted on 100 randomly chosen ears of wheat per plot. The untreated control showed a visual assessed pest severity of 21% (calculated 20.49%) and a calculated pest incidence of 30.3% with *Fusrium culnorum* (FUSACU).

The following treat levels were tested.

| Treatment Name | Form Conc/Form Unit | Rate Unit |
|---|---|---|
| Untreated control | | |
| Invention | 850 g/kg | 3 kg/ha |
| Invention | 850 g/kg | 5 kg/ha |
| Invention | 850 g/kg | 7 kg/ha |
| FOLICUR | 250 g/l | 1 l/ha |
| DON Q | 704 g/kg | 1.1 kg/ha |
| Invention | 850 g/kg | 3 kg/ha |
| FOLICUR | 250 g/l | 1 l/ha |

The product of the invention applied at 7 kg/ha exhibited 64.542% control of *Fusarium culmorum*. The reference product DON Q applied at 1.1 kg/ha gave 56.0% control of FUSACU and Folicur at 1 l/ha gave 52.4% control.

At assessment time clear symptoms of *Fusarium culmorum* were observed.

The highest control of *Fusarium culmorum* was obtained with the product of the invention mixed with FOLICUR applied at l/ha the product of the invention applied at 3 kg/ha. The control was 64.61%, followed closely by the product of the invention applied at 7 kg/ha with 64.52%. The reference DON Q applied at 1.1 kg/ha controlled FUSACU with 56.0%.

The results were as follows.

| Treatment Name | Form Conc/Form Unit | Rate Unit | Disease Incidence % | EFFICACY % untreated | Disease Severity % |
|---|---|---|---|---|---|
| Untreated Control | | | 30.3 | 0.00 | 20.49 |
| Invention | 850 g/kg | 3 kg/ha | 22 | 41 | 11.89 |
| Invention | 850 g/kg | 5 kg/ha | 23 | 44 | 11.37 |
| Invention | 850 g/kg | 7 kg/ha | 18 | 64 | 7.23 |
| FOLICUR | 250 g/l | 1 1/ha | 20 | 52 | 9.75 |

-continued

| Treatment Name | Form Conc/Form Unit | Rate Unit | Disease Incidence % | EFFICACY % untreated | Disease Severity % |
|---|---|---|---|---|---|
| DON Q | 704 g/kg | 1.1 kg/ha | 21 | 56 | 9.00 |
| Invention | 850 g/kg | 3 kg/ha | 21 | 53 | 9.47 |
| Invention | 850 g/kg | 3 kg/ha | | | |
| Invention | 850 g/kg | 3 kg/ha | 17 | 64 | 7.01 |
| FOLICUR | 250 g/l | 1 l/ha | | | |

After harvest samples were analysed for mycotoxin levels Vomitoxin (DON) and Zaeraleone (ZEA). The untreated sampled showed a Voritoxin level of 1.87 mg/kg. The lowest mycotoxin level was measured for the reference FOLICUR with 0.26 mg/kg for DON. The level of ZEA in the untreated control was under the measurable range 10.00 µg/kg.

The results were as follows.

| Treatment Name | Form Conc/Form Unit | Rate Unit | DON (mg/kg grain) | ZEA µg/kg lower than |
|---|---|---|---|---|
| Untreated Control | | | 1.87 | 10.00 |
| Invention | 850 g/kg | 3 kg/ha | 0.82 | 10.00 |
| Invention | 850 g/kg | 5 kg/ha | 0.57 | 10.00 |
| Invention | 850 g/kg | 7 kg/ha | 0.76 | 10.00 |
| FOLICUR | 250 g/l | 1 l/ha | 0.26 | 10.00 |
| DON Q | 704 g/kg | 1.1 kg/ha | 0.43 | 10.00 |
| Invention | 850 g/kg | 3 kg/ha | 0.86 | 10.00 |
| Invention | 850 g/kg | 3 kg/ha | | |
| Invention | 850 g/kg | 3 kg/ha | 0.6 | 10.00 |
| FOLICUR | 250 g/l | 1 l/ha | | |

The invention claimed is:

1. A method for treatment of crop vegetation to control, reduce or eliminate mycotoxins comprising:
    applying to the crop vegetation from 0.5 to 10 kilograms per hectare, an aqueous spray solution of a fungicide composition comprising a bicarbonate salt and a surfactant system comprising two or more surfactants including sodium dodecyl sulphosuccinate and sodium lauryl sulfate which, when applied to the crop vegetation, results in crystals of the bicarbonate salt on a plant surface of the crop vegetation of a particle size of less than 0.4 mm upon evaporation of water of the aqueous spray solution; and
    wherein one surfactant of the surfactant system acts as a dispersant and controls the particle size of the crystals of the bicarbonate salt and another surfactant of the surfactant system acts as a spreader and sticker to distribute the aqueous spray solution and the bicarbonate salt crystals that derive therefrom across the plant surface of the crop vegetation.

2. The method according to claim 1, wherein the crop vegetation comprises cereals or rice.

3. The method according to claim 2, wherein the crop vegetation comprises wheat and the mycotoxins comprise *Fusarium* species.

4. The method according to claim 1, wherein the aqueous spray solution has a surface tension in a range of 25-45 nN/m and has a contact angle of less than 60°.

5. The method according to claim 4, wherein the surface tension is from 28 to 32 nM/m.

6. The method according claim 1, wherein the bicarbonate salt is an alkali metal bicarbonate.

7. The method according to claim 6, wherein the alkali metal bicarbonate is sodium bicarbonate or potassium bicarbonate or mixtures thereof.

8. The method according claim 1, wherein the bicarbonate salt is used in combination with an alkali metal or ammonium carbonate.

9. A method for treatment of crop vegetation comprising wheat to reduce or eliminate *Fusarium* species, the method comprising:
    applying to the crop vegetation comprised of wheat from 0.5 to 10 kilograms per hectare of an aqueous spray solution of a fungicide composition comprising a bicarbonate salt and a surfactant system comprising sodium dodecyl sulphosuccinate and sodium lauryl sulfate.

10. The method according to claim 9, wherein the aqueous spray solution has a surface tension in a range of 25-45 nN/m and has a contact angle of less than 60°.

11. The method according to claim 10, wherein the surface tension is from 28 to 32 nM/m.

12. The method according to claim 9, wherein the bicarbonate salt is an alkali metal bicarbonate.

13. The method according to claim 12, wherein the alkali metal bicarbonate is sodium bicarbonate or potassium bicarbonate or mixtures thereof.

14. The method according to claim 9, wherein the bicarbonate salt is used in combination with an alkali metal or ammonium carbonate.

15. The method according to claim 4, wherein the contact angle is in the range of 35°-60°.

16. The method according to claim 10, wherein the contact angle is in the range of 35°-60°.

17. The method according claim 4, wherein the bicarbonate salt is an alkali metal bicarbonate.

18. The method according to claim 5, wherein the bicarbonate salt is an alkali metal bicarbonate.

19. The method according to claim 10, wherein the bicarbonate salt is an alkali metal bicarbonate.

20. The method according to claim 11, wherein the bicarbonate salt is an alkali metal bicarbonate.

* * * * *